July 21, 1964   J. H. SPENCER ETAL   3,142,001
RINGLESS METER SOCKET HAVING COMBINED POSITIONER AND RAINSHIELD
Filed March 6, 1961   3 Sheets-Sheet 2
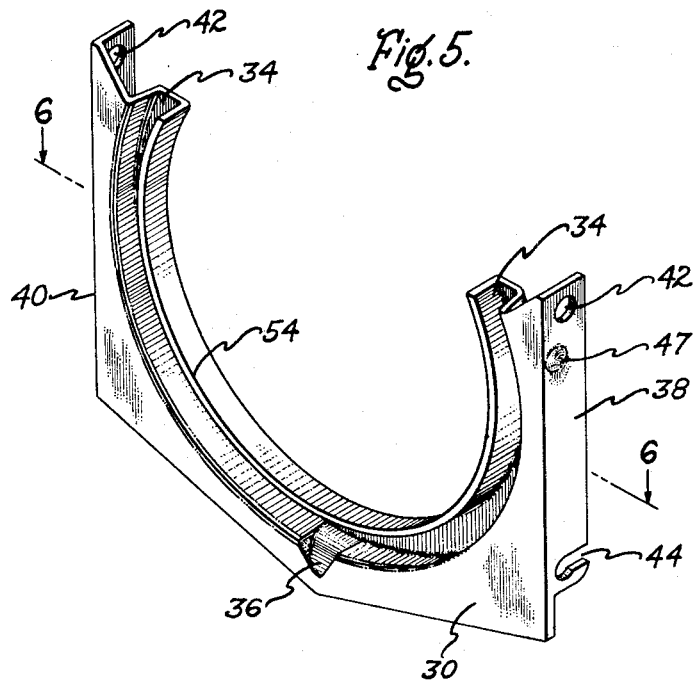
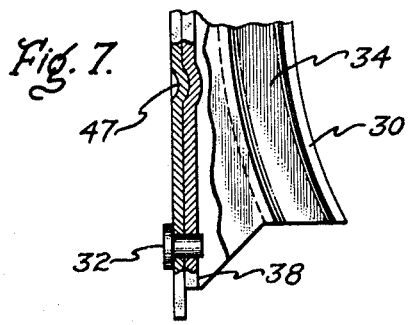
Inventors,
John H. Spencer,
Dankmar Hallbauer,
by Francis X. Doyle
Their Attorney.

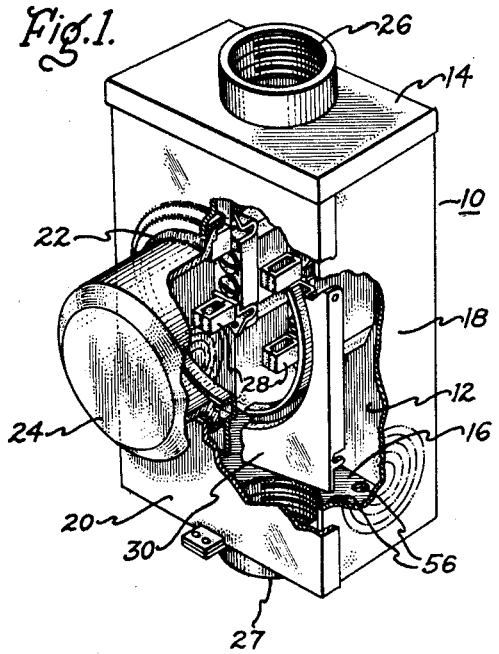
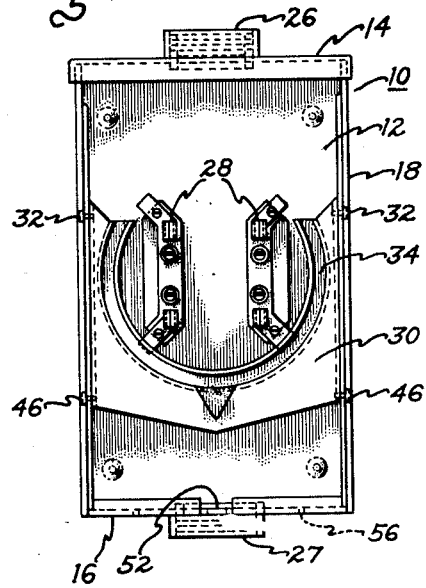
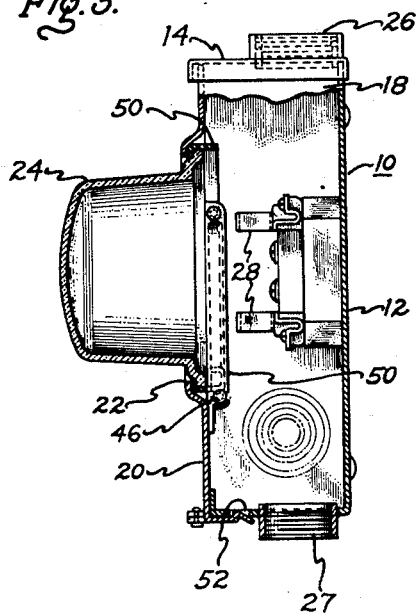
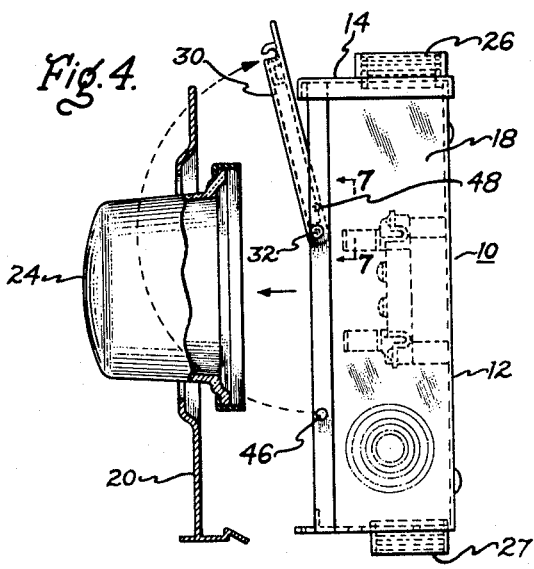
Inventors,
John H. Spencer,
Dankmar Hallbauer,
by Francis X. Doyle
Their Attorney.

July 21, 1964  J. H. SPENCER ETAL  3,142,001
RINGLESS METER SOCKET HAVING COMBINED POSITIONER AND RAINSHIELD
Filed March 6, 1961  3 Sheets-Sheet 3

Inventors,
John H. Spencer,
Dankmar Hallbauer,
by Francis Y. Doyle
Their Attorney.

United States Patent Office 3,142,001
Patented July 21, 1964

3,142,001
RINGLESS METER SOCKET HAVING COMBINED
POSITIONER AND RAINSHIELD
John H. Spencer, Gonic, N.H., and Dankmar Hallbauer,
Berwick, Maine, assignors to General Electric Company, a corporation of New York
Filed Mar. 6, 1961, Ser. No. 93,808
5 Claims. (Cl. 317—105)

This invention relates to a ringless meter socket and more particularly to a ringless meter socket being provided with a combined positioner and rainshield means to aid in correctly positioning a meter within such meter socket, and to prevent any water that enters between the meter and the socket from contacting the live terminals of the meter and the meter socket.

As is well known to those skilled in the art, meter sockets for the mounting of meters, such as watthour meters, are generally provided with a number of terminal jaws which provide the desired contact between the line leads from the utility company and the meter, and from the meter to the load leads of the customer. In the older type sockets, wherein the meter socket was formed with a cover having an opening therein through which the meter, such as a watthour meter, was inserted, the opening in the cover in general formed a positioner to aid in correctly positioning the meter within the meter sockets such that the meter blades or posts made the desired contact with the terminal jaws of the meter socket. However, in present day meter sockets, wherein the so-called "ringless socket" is used, a removable cover is provided for the meter socket and such cover is removed while the meter is being inserted into the socket. When the meter is in place the removable cover is inserted on the meter socket over the meter and provides means for holding the meter within the meter socket and preventing it from being disturbed by unauthorized persons.

In these ringless sockets it is difficult to line up the meter blades or posts with the various terminal jaws of the meter socket. It has been found desirable to have a positioning means connected with the meter socket to aid in correctly positioning the meter in such socket, such that the meter is positively positioned within the socket so as the meter blades will readily slide into the terminal jaws of the meter socket. However, due to the necessity of connecting the various line leads and load leads to the cable clamps, which are connected to the various terminal jaws within the meter socket, it is necessary that any such positioner provide ready access to the cable clamps to enable the attaching of the various line leads and load leads. Thus, it can be seen that in the present day meter socket art, and in particular in ringless meter sockets, there is a need for a positive meter positioning means which will allow the rapid and accurate positioning of the meter within the meter socket while at the same time allowing ready access of the cable clamps within the meter socket for the connection of the line leads and load leads.

Another problem encountered in present day ringless socket is the requirement of an adequate sealing means between the glass cover of the meter and the removable cover of the meter socket. In order to adequately seal this opening to keep out rain, especially where the meter is externally mounted on the customer's building, it has been the practice to provide a separate gasket which is fitted over the glass meter cover, and which forms a fairly tight seal between the glass meter cover and the removable socket cover. On occasions it happens that a meter is carried to the site for insertion into a meter socket and it is found that the proper gasket is not readily available. In such instances, this either necessitates an extra trip to obtain the desired gasket or else the installation is made with no gasket, which as will be readily understood, can lead to a faulty seal between meter cover and the meter socket cover, thus enabling rain or moisture to enter between the meter cover and the meter socket cover. This could damage the meter or the meter sockets should such rain or moisture contact the various live terminals within the meter socket.

In installations now being made the meters are generally mounted on the exterior of the customer's dwelling and are left in place for a number of years. Through the course of these years, it will be understood that the sealing means between the meter housing and the cover of the meter socket may lose its resiliency and sealing power and thereby allow water to enter into the meter socket. If this water should come in contact with the various live terminals of the meter socket, it could cause great damage. Further, these meters are tested through the course of their years and it is understood that during such testing the gasket or other sealing means between the glass meter cover and the cover of the meter sockets may be improperly fitted upon the return of the socket cover over the meter glass cover. This, of course, can lead to faulty sealing and again presents the problem of rain or moisture entering and damaging the various terminals within the meter socket. Thus, it can be seen that it is desirable in the ringless meter socket art to provide a rainshield means which is part of the meter socket, which will positively prevent any water which may enter between the meter and the meter socket cover from entering into contact with the live terminals within the meter socket and causing damage thereto.

The desired rainshield means should also have a long life and retain its function during repeated removal and replacement of the meter in the socket. It would also be advantageous to have the rainshield means capable of deflecting the water around the meter and disposing of such water away from the terminals of the socket to prevent damage to the meter or meter socket terminals.

Obviously, it would be very advantageous if both the meter positioning means and the rainshield of the ringless meter socket could be combined to provide a meter positioner and rainshield as a single unit attached to the ringless meter socket. Further, as is well known to those skilled in the art, the meters are generally provided with surge relief gaps to prevent any lightning surges or unusual surges in the line from causing damage to the meter. In order that these surge relief gaps in the meter adequately operate to protect the meter, it is necessary that the surge relief gaps be grounded to the grounded ringless meter socket. The desirability of providing this grounding of the surge relief gaps of the meter to the ringless meter socket by means of a combination meter positioner and rainshield will be readily apparent, since it will dispense with the necessity of providing other means within the meter socket to perform such grounding.

It is, therefore, an object of this invention to provide a ringless meter socket having a new positioner means within such sockets to positively position a meter within the meter socket.

It is another object of this invention to provide a novel meter positioner means for a ringless meter socket in which ready access is provided for connecting various lines to the meter socket cable clamps.

It is a further object of this invention to provide a rainshield in conjunction with a ringless meter socket which will obviate the need of a sealing gasket between the glass meter cover and the removable cover of the ringless meter socket.

A further object of this invention is to provide a ringless meter socket with a novel rainshield means which will retain its desired function over a long period and through repeated removal and replacement of meter within the meter socket.

A still further object of this invention is to provide a rainshield in conjunction with a ringless meter socket, such rainshield acting to deflect any water entering between the meter cover and the cover of the ringless meter socket about such cover and disposing of it away from the terminals of the socket to thereby prevent any rain water from coming in contact with the various live terminals of the meter or the meter socket.

Another object of this invention is to provide a ringless meter socket with a combined positioner and rainshield means which will enable the positive positioning of the meter within the meter socket while at the same time providing means to deflect any rain water entering between the meter and the meter socket around such meter and dispenses with it in a manner to prevent damage to the terminals of the meter socket.

A still further object of this invention is to provide a ringless meter socket with a combined rainshield and positioner means wherein the rainshield and positioner means provides a grounding connection for the surge relief gaps of the meter to the grounded ringless meter socket.

In carrying out this invention in one form, a ringless meter socket having an open front end is provided with a combination rainshield and meter positioner device made from an electrically conductive material. The combined positioner and rainshield is mounted in the open front of the meter socket, and is provided with an annular groove therein, such annular groove defining an annular opening in the top portion of such device. The annular groove is adapted to receive a portion of the base of a meter to accurately position such meter within the meter socket and also to guide any rain entering between the meter and the meter socket away from the terminals of the socket to prevent its contacting any of the live terminals of the meter or the meter socket.

The rainshield and meter positioner may be either movably or removably mounted in the open front of the meter socket as desired, to provide access to the meter socket cable clamps.

The invention which is sought to be protected will be specifically pointed out in the claims appended to this specification. However, the invention and the manner in which its objects as well as other objects and advantages are obtained, will be better understood from the following detailed description thereof, taken in connection with the accompanying drawings in which:

FIG. 1 is a perspective view of a ringless meter socket showing the glass meter cover in place and having portions cut away to show one form of the combination rainshield and meter positioner of this invention;

FIG. 2 is a front view of a ringless socket with cover removed, showing one form of the combined rainshield and positioner mounted in the meter socket;

FIG. 3 is a sectional side view of the meter cover and meter casing shown in FIG. 1;

FIG. 4 is a side view similar to FIG. 3 showing the removable cover and meter cover being removed from the meter socket and showing the combination rainshield and positioner in its upward position to provide access to the lower cable clamps of the meter socket;

FIG. 5 is a perspective view of one form of the combination rainshield and meter positioner of this invention;

FIG. 6 is a view taken on the line 6—6 of FIG. 5;

FIG. 7 is a view from 7—7 of FIG. 4 showing a detail of the connection of the combination rainshield and meter positioner to the ringless meter socket;

Figure 8:
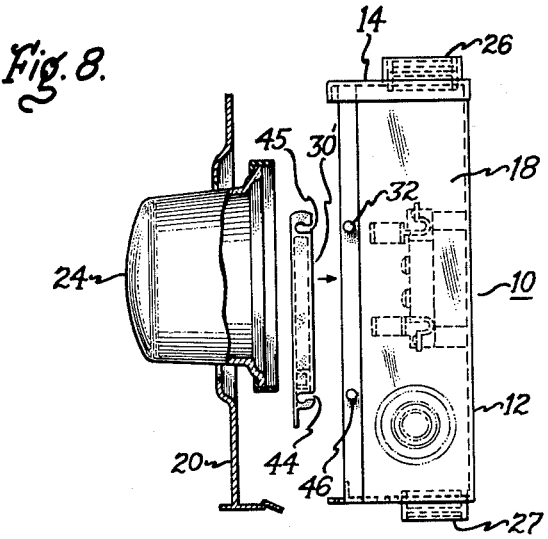
FIGURE 8 is a side view, similar to FIG. 4, showing a modified form of the combination rainshield and meter positioner of this invention as being removable from the open front of the meter socket.

Referring now to the drawings, in which like numerals are used to indicate like parts throughout and, in particular, with reference to FIG. 1, there is shown a perspective view of a ringless meter socket showing the glass meter cover of a meter such as, for example, a watthour meter, being mounted in the meter socket. As shown in FIG. 1, the ringless meter socket generally designated 10, comprises a box-like device being provided with a back wall 12, top and bottom walls 14 and 16 respectively, and side walls 18. The ringless meter socket box 10 is also provided with a removable cover 20, having an opening therein generally designated 22, through which the glass meter cover 24 extends when a meter, such as, for example, a watthour meter is mounted within the meter socket box 10. An opening 26 is provided in the top 14 of the meter socket 10 for the entrance of the line leads from the utility company for connection to the terminals of the meter socket box in a manner well known to those skilled in the art. A similar opening 27 is provided in bottom wall 16 for the exiting of the customer's leads.

The meter socket box 10 is also provided with at least four terminal jaws 28 into which the meter blades or posts (not shown) are inserted when the meter is mounted within the meter socket box. As is well understood by those skilled in this art, the line leads from the utility company are connected to two of the terminal jaws 28, generally by means of cable clamps (not shown) while the load leads to the customer's circuits are connected to the other two terminal jaws 28, also by means of cable clamps (not shown). With these connections the electrical energy from the utility flows from the line leads of the utility through the meter and into the load leads of the customer.

In order to properly position a meter within the meter socket box 10, and to provide a desired shielding to prevent any rain water from entering between such meter and the meter socket box so that it could contact the various live terminals of the meter socket box 10, a combination meter positioner and rainshield generally designated 30, is provided within the meter socket box 10 as will be more fully described hereafter.

Referring now to FIG. 2, the meter socket box 10 is shown with the removable cover removed and a metallic plate 30 forming a combined rainshield and meter positioner in place within the meter socket box. As shown in FIG. 2, the combination rainshield and meter positioner 30 is in the form of a partial cover in the open front end of the ringless meter socket box 10. The combined shield and positioner 30 is pivotally mounted to the sides 18 of the meter socket by any desired means such as, for example, the rivets 32, so that it can be swung up, out of the way, to enable ready access to the lower cable clamps (not shown) of the meter socket box for the attaching of the load lines of the customer to the lower terminals 28. The swinging of the combination rainshield and positioner in an upward manner out of the way to provide access to the lower cable clamps, is more clearly shown in FIG. 4 of the drawing.

The combination rainshield and positioner 30 is provided with an annular groove 34, the annular groove 34 preferably forming less than a complete circle, being shown as approximately ¾ of a circle and having its top portion completely open to the meter socket 10. It will be understood that the annular ring 34 could form a complete circle, if desired. However, for ease of access to the top terminals 28, as well as for the lower manufacturing costs the preferred form is as shown. The annular groove 34 provides a means for receiving a portion of the base and glass cover of the meter so as to accurately position the meter within the meter socket box such that the meter blades or posts will accurately contact the various terminal jaws 28 of the meter socket. Further, by the insertion of the meter within the meter positioner the groove provides a track for deflecting any rain which may enter between the meter and the removable cover of the meter socket box around the meter and dispose of such water to the lower portion of the meter socket box 10.

Reference will now be made to FIGURES 5 and 6, wherein the preferred form of the combination rainshield and meter positioner 30, is clearly shown. As shown in FIGURES 5 and 6, the annular groove 34 is provided at its lower extremities with a trough-like spout 36, whereby any rain water or moisture which may enter the groove 34 will run down the grooves and out through the spout 36 where it will be dropped into the lower portion of the meter socket box and run out below the removable cover 20. The combination rainshield and meter positioner 30 is provided with two straight sides 38 and 40, these sides being adjacent the sides 18 of the meter socket box. Holes 42 are provided in the top of each side of the combination rainshield and meter positioner and mate with comparable holes in the side 18 of the meter socket box for the reception of the rivets 32. By means of studs 32 the combination rainshield and meter positioner is pivotally mounted within the meter socket box. At the lower portion of each of straight sides 38 and 40 a notch 44 is provided (only one of them being shown), these notches butt against the studs 46, shown more particularly in FIGURE 2, to hold the combination rainshield and meter positioner in the desired position within the meter socket box 10. Also, formed in each of the sides 38 and 40, is an indentation or dimple means 47 which co-operates with a dimple means or indentation 48 in the top portion of the meter socket box 10 to hold the combination rainshield and meter positioner 30 in its raised position as shown, more particularly, in FIGURES 4 and 7. By means of the dimples 47 and 48, the combination rainshield and meter positioner 30 can be swung upwardly in the manner shown in FIGURE 4, and the dimples 47 and 48 cooperate to hold the combination rainshield and meter positioner 30 in the upward position, allowing a utility employee to provide the desired connections to the lower cable clamps (not shown) of the meter socket box 10.

The manner in which the meter socket, the meter socket cover, the meter cover, and the combination rainshield and positioner co-operate, is more clearly shown in FIGURES 1 and 3 of the drawing. As there shown, the combination rainshield and positioner 30 is mounted in its normal position in the meter socket box and the meter is inserted into the meter socket box with the lower portion of the glass meter cover being received in the annular groove 34 of the combination rainshield and meter positioner. The removable meter socket box cover 20 is then inserted over the meter, the opening 22 fitting around the meter cover 24 and holding the meter firmly secured within the meter socket box 10. The opening 22 fits against the cover ring 50 of the glass meter cover 24 and firmly holds the meter in the meter socket box. Should any rain enter between the sides of the meter cover 24 and the meter socket cover 20, the rain water will enter the annular groove 34 of the combination rainshield and the meter positioner 30, and be deflected around the meter and will spill off through the spout 36 into the lower portion of the meter socket box 10, where it cannot contact any of the live terminals of the meter socket box. This rain water or moisture will then exit from the meter socket box 10 from the base thereof, either through the snap catch opening 52, or between the bottom wall 16 and the removable front cover 20. It should be understood that vent holes 56 may be provided in the bottom wall 16 of the meter socket box 10, if desired, to allow the moisture collected therein to more readily drain from the socket box 10.

Also, if desired, the spout 36 could be formed to fit through an opening in the meter socket cover 20 to allow the water and moisture from the annular groove 34 to be drained directly outside of the meter socket box 10.

Figure 9:
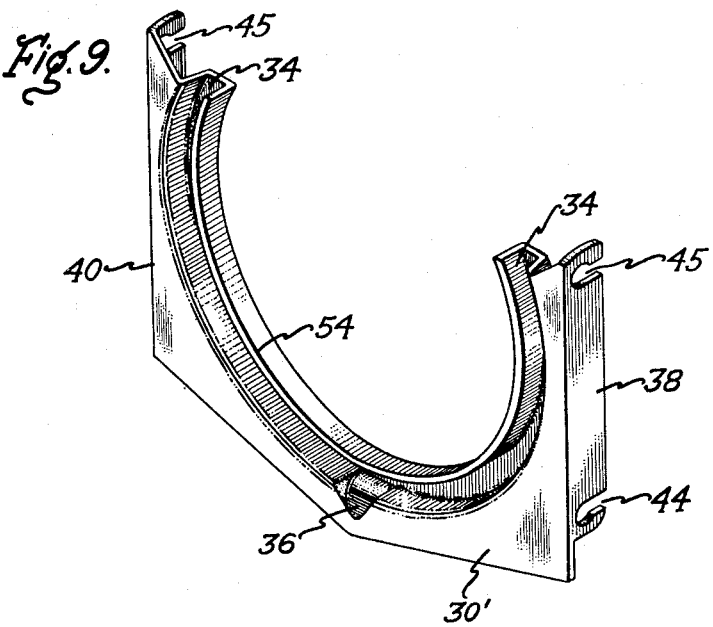
FIG. 9 is a perspective view of the modified form of rainshield and meter positioner of this invention shown in FIG. 8.

Referring now to FIGS. 8 and 9 of the drawing, a modified form of the rainshield and meter positioner is shown. In this form of the invention the rainshield and meter positioner 30' is provided with the notches 44 and 45, the notches 45 being provided in place of the holes 42. In this embodiment of the invention the rainshield and meter positioner 30' may be entirely removed from the open front of the meter socket 10 to provide access to the meter socket cable clamps. As shown in FIG. 8, the notches 45 co-operate with the studs or rivets 32 while the notches 44 co-operate with the studs 46 to removably mount the rainshield and meter positioner 30' in the open front of the meter socket 10. The rainshield and meter positioner 30' operates in the same manner as previously described with reference to the rainshield and meter positioner 30. The only difference is in the manner of mounting the rainshield and meter positioner in the open front of the meter socket 10.

From the above description, it will be understood that a new and novel combination rainshield and meter positioner has been provided for use with ringless socket boxes, whereby meters can be accurately and simply positioned within the meter socket and moisture and rain can be prevented from entering into the meter socket between the meter and the removable meter socket cover in such manner that it could contact the various live terminals of the meter or meter socket, thereby causing short circuits and other damage to the meter. Of course, it is well understood by those skilled in the art, that the meter which will be utilized with the ringless meter socket box, will be provided with a number of surge relief gaps in the base thereof, and that these surge relief gaps will contact the inner rim 54 of the annular groove 34 so as to provide the desired grounded connection between such surge relief clips and the grounded meter socket box. Thus, there has been disclosed a combination rainshield and positioner which is attached to the ringless socket box and which meets all of the desired objectives of this invention.

Of course, it will be understood by those skilled in the art, that various changes and modifications may be made in the combination rainshield and meter positioner of this invention without departing from the inventive concept set forth in this specification. While there has been disclosed and described the preferred embodiments thereof, it will be obvious that various changes may be made, such as, for example, making the annular groove somewhat larger; that is, greater than three-quarters of a circle, while still obtaining the desired objects of the invention. Therefore, it is to be understood that the above description is for purposes of illustration only, and is not to be considered limiting of the invention disclosed herein, rather it is desired to cover all such changes and modifications as may be made within the spirit and scope of this invention as defined in the appended claims.

This application is a continuation in part of patent application Serial No. 17,858, filed March 28, 1960 and now abandoned.

What is claimed as new and is desired to secure by Letters Patent of the United States is:

1. A combination rainshield and meter positioner for a ringless meter socket, comprising a metallic plate of a size to fit within a meter socket, said metallic plate being formed with two straight sides, first mounting means formed in the top portion and second mounting means formed in the bottom portion of said straight sides for mounting said plate within the open front of a meter socket, an annular groove formed in said metallic plate, said annular groove adapted to receive a portion of a meter to be mounted in a meter socket to position such meter within such socket, and a trough-like spout in the lower part of said annular groove, whereby rain water entering said annular groove will be directed around said groove, and out from said spout.

2. A combination rainshield and meter positioner as claimed in claim 1 in which said first mounting means are holes adapted to receive studs for pivotally mounting said plate within the open front of a meter socket for pivotal movement in an upward direction.

3. A combination rainshield and meter positioner as claimed in claim 1 in which said first mounting means are notches adapted to cooperate with studs to removably mount said plate within the open front of a meter socket.

4. A ringless meter socket provided with a combination meter positioner and rainshield comprising, a meter socket box open at its front, a removable cover for said box, a metallic plate, pivot means secured to opposite sides of said box, said metallic plate pivotally mounted on said pivot means within the open front of said box, means on said opposite sides of said box co-operating with means on said plate to releasably hold said plate in a position parallel with said open front of said box, an annular groove formed in said metallic plate, said annular groove adapted to receive a portion of a meter to be mounted in said socket, whereby when said plate is in parallel position with the open front of said box, said annular groove serves as a positioner to accurately position a meter within said box, and a trough-like spout formed in the lower part of said annular groove, whereby when a meter is positioned within said box said groove will direct water around said meter to exit from said spout.

5. A ringless meter socket provided with a combination rainshield and meter positioner comprising, a meter socket box open at its front, a removable cover for closing said open front, a metallic plate pivotally mounted within said open front of said box, first means on opposite sides of said box co-operating with first means on said metallic plate to releasably hold said metallic plate in a first position in which said metallic plate is in a plane parallel to the plane of said open front of said box, second means on said opposite sides of said box co-operating with second means on said metallic plate to releasably hold said metallic plate in a second position in which the plane of said plate is at an angle with respect to the plane of said open front of said box, an annular groove formed in said metallic plate, said annular groove being adapted to receive a portion of a meter, whereby when said plate is in said first position said annular groove serves to accurately position a meter within said meter socket box, and a trough-like spout formed in the lower portion of said annular groove, whereby when a meter is positioned in said meter socket box and said removable cover is in place any water entering between the meter and said cover is directed by said groove around the meter to exit from said spout.

References Cited in the file of this patent
UNITED STATES PATENTS

| | | |
|---|---|---|
| 1,134,257 | Chase | Apr. 6, 1915 |
| 3,014,162 | Carlisle | Dec. 19, 1961 |